(12) United States Patent
Ionov

(10) Patent No.: US 7,171,082 B2
(45) Date of Patent: Jan. 30, 2007

(54) METHOD AND APPARATUS FOR OPTICAL TOP-HAT PULSE GENERATION

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 234 days.

(21) Appl. No.: 10/735,071

(22) Filed: Dec. 12, 2003

(65) Prior Publication Data

US 2005/0013543 A1   Jan. 20, 2005

Related U.S. Application Data

(60) Provisional application No. 60/488,540, filed on Jul. 18, 2003.

(51) Int. Cl.
  G02B 6/26    (2006.01)
  G02B 6/42    (2006.01)
  H04B 10/04   (2006.01)

(52) U.S. Cl. ............... 385/39; 385/27; 385/32; 385/95; 398/182

(58) Field of Classification Search ........... 385/15, 385/27, 32, 39, 95; 398/182–201; 359/264
See application file for complete search history.

(56) References Cited

U.S. PATENT DOCUMENTS

| | | | | |
|---|---|---|---|---|
| 5,208,455 A | 5/1993 | Nelson et al. | ......... | 250/227.19 |
| 5,717,797 A | 2/1998 | Evans | ......... | 385/27 |
| 6,424,773 B1 | 7/2002 | Watanabe | ......... | 385/122 |
| 6,462,860 B1 | 10/2002 | Ionov | ......... | 359/325 |
| 6,466,703 B1 | 10/2002 | Ionov | ......... | 385/10 |
| 6,901,177 B2 * | 5/2005 | Ionov | ......... | 385/15 |

FOREIGN PATENT DOCUMENTS

EP   0 521 671 A2   1/1993
WO   01/95526 A2   12/2001

OTHER PUBLICATIONS

U.S. Appl. No. 10/701,378, filed Nov. 3, 2003, Ionov.
U.S. Appl. No. 10/973,696, filed Oct. 25, 2004, Ionov.
U.S. Appl. No. 11/033,571, filed Jan. 11, 2005, Ionov.
Black, H.S., *Modulation Theory*, D. Van Nostrand Company, Inc., New York, pp. 283-298 (1953).

(Continued)

*Primary Examiner*—Frank G. Font
*Assistant Examiner*—Michael P. Mooney
(74) *Attorney, Agent, or Firm*—Ladas & Parry LLP

(57) ABSTRACT

An optical top-hat pulse generator comprising a polarization-maintaining fiber loop and controlled by solitons. A polarization-maintaining coupler launches a continuous wave optical signal into the fiber loop along a principal axis of the fiber loop. Another coupler launches a control pulse into the fiber loop along another orthogonal principal axis. The fiber loop may consist of a plurality of sections of polarization-maintaining fiber spliced together so that the principal axis of one section aligns with the orthogonal principal axis of an adjacent section and the length of each individual section is chosen to achieve equal in magnitude, but opposite in sign group delays between the continuous wave optical signal and the control pulse.

26 Claims, 6 Drawing Sheets

OTHER PUBLICATIONS

Diez, S., et al., "Gain-Transparent SOA-Switch for High-Bitrate OTDM Add/Drop Multiplexing," *IEEE Photonics Technology Letters*, vol. 11, No. 1, pp. 60-62 (Jan. 1999).

Haus, H.A., *Waves and Fields in Optoelectronics*, Prentice-Hall, Inc., Englewood Cliffs, New Jersey, pp. 216-220 (1984).

Petermann, K., "Basic Laser Characteristics," *Laser Diode Modulation and Noise*, Kluwer Academic Publishers, Dordecht/Boston/London, Chapter 2, pp. 4-59 (1988).

Schubert, C., et al., "160-Gb/s All Optical Demultiplecxing Using a Gain-Transparent Ultrafast-Nonlinear Interferometer (GT-UNI)," *IEEE Photonics Technology Letters*, vol. 13, No. 5, pp. 475-477 (May 2001).

Schubert, C., et al., "Comparison of Interferometric All-Optical Switches for Demulitplexing Applications in High-Speed OTDM Systems," *Journal of Lightwave Technology*, vol. 20, No. 4, pp. 618-624 (Apr. 2002).

U.S. Appl. No. 10/341,689, filed Jan. 13, 2003, Ionov.

Agraval, G.P., "Optical Solitons," *Nonlinear Fiber Optics*, Chapter Five, Academic Press, New York, pp. 133-152 (1995).

Bigo, S., et al., "All-Optical Fiber Signal Processing and Regeneration for Soliton Communications," *IEEE Journal of Selected Topics in Quantum Electronics*, vol. 3, No. 5, pp. 1208-1222 (Oct. 1997).

Wang, D., et al., "Nonlinear Optical Loop Mirror Based n Standard Communication Fiber," *Journal of Lightwave Technology*, vol. 15, No. 4, pp. 642-646 (Apr. 1997).

* cited by examiner

METHOD AND APPARATUS FOR OPTICAL TOP-HAT PULSE GENERATION

CROSS-REFERENCE TO RELATED APPLICATIONS

The present application is related to and claims the benefit of U.S. Provisional Application No. 60/488,540, filed on Jul. 18, 2003, and titled "Method and Apparatus for Optical Top-Hat Pulse Generation." The disclosure of U.S. Provisional Application No. 60/488,540 is incorporated by reference herein in its entirety.

The present application is also related to U.S. patent application Ser. No. 10/341,689, (Now U.S. Pat. No. 6,901,177), entitled "An Optical Top Hat Pulse Generator," and filed Jan. 13, 2003, incorporated by reference herein in its entirety.

BACKGROUND

1. Field

The present disclosure relates to coherent detection of pulse position modulated signals. More particularly, the present disclosure describes a top-hat pulse generator (THPG) comprising polarization maintaining fiber in a nonlinear optical loop mirror, where the THPG is suitable for use in a system for the detection and demodulation of pulse position modulated optical pulses.

2. Description of Related Art

Many satellite and terrestrial optical communication systems require transmission of analog optical signals. The straightforward way to address this need is to modulate the amplitude of an optical carrier. This approach, however, suffers from poor signal-to-noise ratio (SNR). It is well known that broadband modulation techniques, which utilize higher bandwidth than that of the transmitted waveform, may improve SNR over that achieved with amplitude modulation. Pulse Position Modulation (PPM) is one of these techniques. In PPM, a temporal shift in the pulse position represents a sample of the transmitted waveform. The improvement in SNR near the Nyquist sampling frequency of a pulse position modulated signal over an amplitude modulated signal is shown below:

$$SNR_{ppm} \propto SNR_{am}(t_p/\tau)^2 \qquad \text{Eq. (1)}$$

where $t_p$ is the temporal spacing between unmodulated pulses and $\tau$ is the pulse duration.

Conventional detection or demodulation of analog PPM optical signals, though, suffers from poor SNR at low frequencies. PPM signals are usually demodulated from the optical to electronic domain by a photodiode followed by a lowpass filter (LPF) that converts pulse position modulation to amplitude modulation. Such a demodulation technique is not capable of recovering the DC component, since the DC component is represented by a constant temporal shift of all pulses from their unmodulated positions. Moreover, the demodulated signals after the lowpass filter have very low amplitude at low frequencies. The amplitude increases linearly with frequency up to the Nyquist limit. Such frequency-dependent distortion is corrected by an integration circuit, which amplifies low-frequency noise accordingly, resulting in decreased SNR performance.

An apparatus and method for detecting an optical PPM signal are described in U.S. Pat. No. 6,462,860, herein incorporated by reference. FIG. 1 depicts an optical receiver 50 that detects optical pulse position modulated signals and converts the detected pulses to an electrical waveform according to the general disclosure of U.S. Pat. No. 6,462,860. The optical receiver 50 receives both short optical clock pulses 11 and short pulse position modulated optical pulses 21. The short optical clock pulses 11, which have a fixed period, are converted to rectangular clock pulses 13 by, preferably, a top hat generator 10. Short optical signal pulses 21 are converted to rectangular pulses 23 by another top hat generator 20. An overlap-to-electric converter 30 detects the amount of overlap 33 between the rectangular clock pulses 13 and the rectangular signal pulses 23 and converts the overlap amount 33 into an electrical signal. The overlap amount is a measure of the delay between the optical clock pulses 11 and the pulse position modulated signal pulses 21. The overlap-to-electric converter 30 may comprise a coherent correlator, a sum frequency generator, a four-wave mixer, or other means that can measure the amount of overlap between separate streams of rectangular pulses and output the measured amount as an electrical signal.

As noted above, overlap to electric conversion may be achieved by any of several methods known in the art. For example, an exemplary coherent correlator 140 is shown in FIG. 4A and is described in additional detail below, in relation to the circuit depicted in FIG. 2. The overlap-to-electric converter 30 may also comprise a sum frequency generator or a four-wave mixer. Sum frequency generators are well-known in the art. An exemplary sum frequency generator is depicted in FIG. 4B and is described in additional detail below. An exemplary four-wave mixing apparatus is depicted in FIG. 4C and is described in additional detail below. However, those skilled in the art will understand that additional methods and apparatus may be used to provide overlap to electric conversion.

The apparatus and method for detecting an optical PPM signal described in U.S. Pat. No. 6,462,860 discloses the use of a coherent correlator for an overlap-to-electric converter. FIG. 2 depicts an embodiment of an optical receiver 100 described in U.S. Pat. No. 6,462,860, which uses a coherent correlator. In FIG. 2, a first top-hat generator 110 receives a pulse position modulated optical signal $P_{sig}(\lambda_{sig})$ and a continuous wave optical signal $CW(\lambda_{CW})$, and produces a rectangular signal pulse output $RP_{sig}(\lambda_{CW})$. Still referring to FIG. 2, a second top-hat generator 120 receives a pulse optical clock $P_{clk}(\lambda_{clk})$ and the continuous wave optical signal $CW(\lambda_{CW})$, and produces a rectangular clock pulse output $RP_{clk}(\lambda_{CW})$. A continuous wave source 130 provides the continuous wave optical signal $CW(\lambda_{CW})$. Depending upon the chosen architecture of the correlator 140, a single CW source 130 or a pair of distinct CW sources may be used. If a pair of distinct CW sources are used the CW sources may either generate on the same or on different wavelengths, again depending upon the architecture of the correlator 140. An optical pulse source (not shown) provides the pulse optical clock signal $P_{clk}(\lambda_{clk})$ such that the optical pulses in the pulsed optical clock signal $P_{clk}(\lambda_{clk})$ are preferable equally spaced or nearly equally spaced in time. Optical pulse sources providing pulsed optical signals are known in the art. The PPM optical signal $P_{sig}(\lambda_{sig})$ and the pulsed optical clock signal $P_{clk}(\lambda_{clk})$ may have the same or different optical wavelengths. In the embodiment depicted in FIG. 2, the rectangular pulse output $RP_{sig}(\lambda_{CW})$ and the rectangular clock pulse $RP_{clk}(\lambda_{CW})$ are synchronized and are coherent since both derive their optical frequency and phase from that of a single continuous-wave source 130.

Still referring to FIG. 2, a coherent correlator 140 receives the rectangular signal pulse output $RP_{sig}(\lambda_{CW})$ and the rectangular clock pulse output $RP_{clk}(\lambda_{CW})$ and produces a current output $I_s(t)$ 74. The output $I_s(t)$ 74 of the coherent correlator 140 is proportional to the cross-correlation product of the rectangular signal pulse output $RP_{sig}(\lambda_{CW})$ and the rectangular clock pulse output $RP_{clk}(\lambda_{CW})$. This cross-correlation product is also proportional to the offset in time between each PPM pulse and its corresponding clock pulse. Thus, the output of the coherent correlator 140 provides a demodulated analog signal corresponding to the original analog pulse position modulated signal.

The top-hat generators 110, 120 shown in FIG. 2 preferably each comprise a nonlinear optical loop mirror (NOLM) with a control input. NOLMs are well known in the art and can be constructed by splicing together commercial fibers and couplers. U.S. Pat. No. 5,208,455, issued to B. P. Nelson et al. on May 4, 1993, describes the construction of a typical nonlinear optical loop mirror. Non-linear optical loop mirrors are also further described by S. Bigo, O. Leclerc, and E. Desurvire in "All Optical Fiber Signal Processing and Regeneration for Soliton Communications," IEEE J. Sel. Topics Quant. Electron., Vol. 3 (1997), p. 1208.

FIG. 3 depicts a typical NOLM 500 with a control input. The NOLM 500 comprises a first coupler 510 for coupling a continuous wave optical signal $OPT_{CW}$ into the NOLM 500 and a second coupler 520 for coupling an optical control pulse $OPT_{CP}$ into the NOLM 500. The optical loop of the NOLM is formed by an optical fiber 550 that is routed from one branch of the first coupler 510 to another branch of the first coupler 510. A filter 560 may be disposed at another branch of the first coupler 510 to filter out signals at the optical wavelength of the optical control pulse, while allowing signals at the optical wavelength of the continuous wave optical signal to pass from the NOLM 500.

Returning to FIG. 2, the one or two frequency continuous wave sources 130 operating at optical wavelengths $\lambda_{1,2CW}$ feed into the top-hat generators 110, 120 comprising NOLMs. Both NOLMs are preferably completely symmetrical so that the continuous wave radiation is reflected completely in the absence of control radiation. The signal and clock pulses at wavelengths $\lambda_{sig}$ and $\lambda_{clk}$, act as control signals in the first and second NOLMs respectively. For the NOLMs to operate correctly, the wavelengths of the control signals $\lambda_{sig}$ and $\lambda_{clk}$ must be different than that of the continuous wave radiation at $\lambda_{CW}$. If properly configured, the NOLMs preferably provide pulses with top-hat temporal shapes.

As shown in FIG. 2, the trains of rectangular signal $RP_{sig}(\lambda_{CW})$ and clock $RP_{clk}(\lambda_{CW})$ pulses at the continuous wave frequency $\lambda_{CW}$ (or frequencies ($\lambda_{1,2CW}$)) are combined in the optical correlator 140. For example, the optical correlator 140 may comprise a 3 dB coupler 141 and a balanced detector 143, as shown in FIG. 4A. In this case, the pulse and signal trains are preferably on the same wavelength and coherent, as is well known in the art. The electric current of the correlator 140 is given by:

$$I = \int_{-\infty}^{\infty} E_{sig}(t - \Delta t) E_{clk}(t) dt \qquad \text{Eq. (2)}$$

where $\Delta t$ is the temporal shift between the signal and control pulses and $E_{sig,clk}(t)$ is the temporal shape of the rectangular pulses.

FIG. 5 shows the relationship between the input optical clock pulses 11 and the pulse position modulated signal pulses 21 and the correlator current 74 produced by the optical correlator 140 depicted in FIG. 2. As shown in FIG. 5, the greater the overlap 33 between the rectangular clock pulses 13 and the rectangular signal pulses 23, the greater the correlator current 74 produced by the optical correlator 140. Of course, as noted above, devices other than an optical correlator may be used to detect the overlap 33 and to output an electrical signal based on the overlap.

As briefly mentioned above, an optical correlator is one way to provide the overlap-to-electric converter used in embodiments of the present invention. However, a sum frequency generation apparatus 440, as shown in FIG. 4B, may also be used. Such circuits are well known in the art. The sum frequency circuit 440 comprises a lens 441 for focusing beams comprising the top-hat pulses of the clock $TH_{clk}$ 446 and the signal $TH_{sig}$ 447 into a non-linear crystal 443. The non-linear crystal may comprise lithium niobate. The two beams 446, 447 are directed through the non-linear crystal 443, where they produce sum-frequency beam 448, which propagates within the sector between the two beams 446, 447 to an aperture 445. The sum-frequency radiation is generated only when the clock pulses and the signal pulses overlap in time. Therefore, the electric current from the photodetector 449 is proportional to the amount of overlap. To increase the efficiency of the sum-frequency correlator, a waveguiding Periodically Poled Lithium Niobate (PPLN) device (available, for example, from Lightbit) may be used. In this case, rectangular signal and clock pulses are preferably on different wavelengths, which call for two distinct CW sources for the corresponding NOLMs.

Four-wave mixing may also be used to provide the required overlap to electric conversion. FIG. 4C depicts a four-wave mixing apparatus well known in the art. The top-hat pulses of the clock $TH_{clk}$ at a wavelength $\omega_{clk}$ and the signal $TH_{sig}$ at a wavelength $\omega_{sig}$ are directed into a single mode fiber 450, which is, preferably, a dispersion shifted fiber. Preferably, the length of the fiber should be below the fiber dispersion length for the top-hat pulses. Four-wave mixing occurs within the fiber 450 to produce a signal at a wavelength $\omega_{4F}=2\omega_{clk}-\omega_{sig}$ or $\omega_{4F}=2\omega_{sig}-\omega_{clk}$. A photodetector may then be used to detect and convert the four-wave output signal to an electric signal that is proportional to the overlap between the clock and signal pulses.

In the embodiment shown in FIG. 2, the rectangular pulse created by a specific PPM pulse should not overlap the rectangular pulse created by a clock pulse for a preceding or a following PPM period. Therefore, the maximum temporal shift for PPM pulses $\Delta t_{Pmax}$ is preferably smaller than the duration of the rectangular pulses $t_{TH}$ created by the top-hat pulse generators, and the sum of the two values, $\Delta t_{Pmax}+t_{TH}$, is preferably less than $t_p$, the interval between the clock pulses. Hence, $\Delta t_{Pmax}<t_p/2$, so the PPM signal preferably has a modulation index M of less than 0.5. Therefore, the individual pulses of the PPM signal are shifted from their non-modulated positions of $\Delta t=\pm t_p/4$ within the time slot of $-t_p/4<\Delta t<t_p/4$.

The linearity of an optical PPM receiver using top-hat pulse generators, whether using the coherent detection technique described above and shown in FIG. 2 or other techniques or apparatus, typically depends on the quality of the rectangular pulses generated by the top-hat pulse generators. The quality of the rectangular pulses is essentially the closeness of the shape of the generated pulses to a true "top-hat" shape. When a NOLM is used to generate the rectangular pulse, the control pulse, which imprints a non-linear phase shift on the co-propagating CW beam as described above, should preferably retain its shape along the whole length of the NOLM. Therefore, in the type of optical PPM receivers shown in FIGS. 1 and 2 and disclosed in U.S.

Pat. No. 6,462,860, the performance of those optical PPM receivers improves as the shapes of the optical pulses provided by the NOLMs more closely approach a true top-hat shape.

In U.S. Pat. No. 6,462,860, a NOLM comprising a fiber having a dispersion that is zero at the wavelength of the control pulse, either signal or clock, is discussed. The control pulse maintains its shape due to the zero dispersion fiber. The result is increased linearity over a conventional NOLM, which provides for a more top-hat shaped pulse. However, this restriction on fiber dispersion may be hard to meet, since most commercial-off-the-shelf fibers do not have this capability. Moreover, even if such fibers are readily available, the control pulse would still suffer some shape degradation due to higher-order dispersion and self-phase modulation.

Instead of special zero dispersion fibers, a NOLM controlled with an optical soliton control pulse may also provide a more linear NOLM than a conventional NOLM. It is well known in the art that optical solitons preserve their temporal shape during propagation. Since the control pulse retains its shape (due to its soliton nature) as it slides along the co-propagating CW beam, a constant nonlinear phase shift is imprinted on the CW beam by the control pulse along the length of their overlap. This constant phase shift assures a flat top of the top-hat pulse at the NOLM output. U.S. patent application Ser. No. 10/341,689 titled "An Optical Top Hat Pulse Generator" and filed Jan. 13, 2003, incorporated by reference herein in its entirety, discloses such a soliton-based NOLM.

If a NOLM is controlled with a soliton control pulse, the output of the NOLM comprises an optical pulse output that has a leading edge, a trailing edge and intermediate plateau that provides for a true "top-hat" shape. Hence, optical PPM receivers using NOLMs that are controlled by first order solitons should provide more linear performance.

When using first order solitons to control a NOLM, the NOLM should comprise a fiber with positive dispersion (in ps/nm×km), which supports optical solitons. The soliton regime for the control pulse is achieved by (i) choosing a fiber with the correct, i.e., positive, dispersion sign (that is, $$D = -\frac{2\pi c}{\lambda^2}, \beta_2 > 0)$$

and (ii) adjusting the peak power of the control pulse inside the loop to that of the first order soliton, as shown below $$P_c = \frac{|\beta_2|}{\gamma t_0^2} = \frac{3.11|\beta_2|}{\gamma t_{FWHM}^2} = \frac{3.11 \lambda^2 D}{2\pi c \gamma t_{FWHM}^2} \qquad \text{Eq. (3)}$$

where $\gamma \approx 1.5-10$ $W^{-1}$/km is the non-linear fiber constant, $t_{FWHM} = 2 \ln(\sqrt{2}+1)t_0$ is the optical pulse duration (full width half maximum), c is the speed of light and D is the fiber dispersion in ps/nm/km. Also, in equation (3), $\beta_2$ is the fiber dispersion (in $s^2$/cm) at the wavelength $\lambda$ of the control pulse.

The peak output power of a top-hat pulse generator controlled by optical solitons may be calculated as follows:

$$p_{TH}^{peak} = P_{CW} \sin^2(\phi_{NL}^{max}) \qquad \text{Eq. (4)}$$

where $P_{CW}$ is the power of the CW beam feeding the NOLM. $\phi_{NL}^{max}$ is the non-linear phase shift of the CW beam that co-propagates with the control pulse and may be calculated as follows:

$$\varphi_{NL}^{max}(t) = C \frac{\delta \lambda_{FWHM}}{\Delta \lambda} \qquad \text{Eq. (5)}$$

where $\delta \lambda_{FWHM} = (2 \ln(\sqrt{2}+1)/\pi^2) \lambda^2 / t_{FWHM} c$ is the bandwidth of a transform-limited ($sech^2$) pulse of $t_{FWHM}$ duration, $\Delta \lambda$ is the de-tuning of the control pulse from the CW beam that feeds the NOLM, and C=3.56 and 1.19 for the same and orthogonal polarizations of the control pulse and CW beam, respectively.

G. P. Agraval, Nonlinear Fiber Optics (Academic Press, New York, 1995) provides the background for calculating the phase shift acquired by the CW beam via cross-phase modulation (XPM). The phase shift is determined by solving the standard nonlinear coupling equations $$\frac{\partial A_{CW}}{\partial z} + \frac{1}{v_{CW}} \frac{\partial A_{CW}}{\partial t} = i\gamma C |A_p|^2 A_{CW} \qquad \text{Eq. (6a)}$$

$$\frac{\partial A_p}{\partial z} + \frac{1}{v_p} \frac{\partial A_p}{\partial t} + \frac{i}{2}\beta_2 \frac{\partial^2 A_p}{\partial t^2} = i\gamma C |A_p|^2 A_p \qquad \text{Eq. (6b)}$$

where $A_{p,CW}$ are amplitudes of control pulses and CW components, C=2, ⅔ for same and orthogonal polarizations, respectively, and $\beta_2 = -(2\pi c/\lambda^2)D$ is fiber dispersion. The dispersion for the CW component is zero, i.e. $\beta_2(\lambda_{CW})=0$, and the XPM of a strong control pulse by a weak CW is negligible. In addition, the fast-oscillating cross-modulation term normally present is also not shown, as the term averages out over any significant distance, such as several wavelengths, i.e. a small fraction of a mm. Eq. (6b) is not coupled to Eq. (6a) and can be solved separately. For $\beta_2<0$, i.e., for positive D, Eqs. (6a) and (6b) provide well-known soliton solutions as shown in Chapter 5 of G. P. Agraval, Nonlinear Fiber Optics (Academic Press, New York, 1995). One skilled in the art will appreciate that the power of the control pulse is equal to that of the fundamental soliton that retains its shape as it propagates along the fiber:

$$A_p = \sqrt{P_0} \operatorname{sech}\left(\frac{t - \frac{z}{v_p}}{t_0}\right) e^{\frac{iz}{2L_D}} \qquad \text{Eq. (7)}$$

where $$P_0 = \frac{\lambda^2}{2\pi c} \frac{D}{\gamma t_0^2} = \frac{\lambda^2}{2\pi c} \frac{3.11 D}{\gamma t_{FWHM}^2}. \qquad \text{Eq. (8)}$$

Substituting Eq. (7) into Eqs. (6a) and (6b) and integrating the latter provides:

$$\varphi_{NL}(z,t) = \frac{CP_0\gamma t_0}{v_{cw}^{-1} - v_p^{-1}} \left[ th\left(\frac{\left(t - \frac{z}{v_p}\right)}{t_0}\right) - th\left(\frac{\left(t - \frac{z}{v_{cw}}\right)}{t_0}\right) \right] \quad \text{Eq. (9)}$$

The maximum phase shift is $$\varphi_{NL}^{max} = 4\frac{P_0\gamma t_0}{v_{cw}^{-1} - v_p^{-1}} \text{ and } \frac{4}{3}\frac{P_0\gamma t_0}{v_{cw}^{-1} - v_p^{-1}} \quad \text{Eq. (10)}$$

for equal and orthogonal polarizations, respectively. Eq. (10) may be further simplified for non-polarization maintaining fibers that dictate the use of small detuning between the CW and control pulsed radiations.

$$v_{cw}^{-1} - v_p^{-1} \approx (\lambda_{cw} - \lambda_p)\frac{d}{d\lambda}\frac{1}{v} = D\Delta\lambda. \quad \text{Eq. (11)}$$

Taking into account that for the fundamental solitons non-linear and dispersion lengths are equal, we get $$P_0\gamma \equiv \frac{1}{L_{NL}} = \frac{1}{L_D} = \frac{\lambda^3}{2\pi c}\frac{3.11D}{t_{FWHM}^2}, \quad \text{Eq. (12)}$$

and Eq. (10) is modified to $$\varphi_{NL}^{max} = C\frac{\lambda^2}{2\pi c}\frac{1}{\Delta\lambda t_0} \quad \text{Eq. (13)}$$

$$= C\frac{\pi}{4\ln(\sqrt{2}+1)}\frac{\lambda_{FWHM}}{\Delta\lambda}$$

$$= 3.56\frac{\lambda_{FWHM}}{\Delta\lambda} \text{ and } 1.19\frac{\lambda_{FWHM}}{\Delta\lambda}$$

for equal and orthogonal polarizations, respectively, where $\lambda_{FWHM}$ is the bandwidth of a transform-limited, sech² pulse with duration $t_{FWHF} = 2\ln(\sqrt{2}+1)t_0$.

The top-hat pulse generator described in U.S. patent application Ser. No. 10/341,689, while providing a more linear version of a top-hat pulse generator than others known in the art, has limited conversion efficiency. The peak output power for the top-hat pulse generator controlled by optical solitons discussed in U.S. patent application Ser. No. 10/341,689 is shown below $$P_{TH}^{peak} = P_{CW}\sin^2(\phi_{NL}^{max}) \quad \text{Eq. (14)}$$

where $P_{CW}$ is the power of the CW seed and $\phi_{NL}^{max}$ is the non-linear phase shift of the CW beam that co-propagates with the control pulse. Thus, conversion efficiency can be calculated by $$\text{conversion efficiency} = \frac{P_{TH}^{peak}}{P_{CW}^{peak}} \quad \text{Eq. (15)}$$

where $P_{TH}^{peak} = P_{TH}\sin^2(\phi_{NL}^{max})$ and $P_{CW}^{peak} = P_{CW}\sin^2(\phi_{sol}^{max})$ Eqs. (5), (14) and (15) illustrate that the non-linear phase shift, and therefore, the output power and conversion efficiency for non-polarization maintaining fibers are determined by the relative de-tuning $\Delta\lambda/\partial\lambda_{FWHM}$. The relative de-tuning is preferably chosen to be relatively large to prevent the control power from leaking into the output.

For example, in the design described in U.S. patent application Ser. No. 10/341,689, the choice of the relative detuning factor may depend on the amount of cross talk between the control pulse and the top-hat pulse output from the top-hat pulse generator. If the cross talk factor is allowed to exceed $2\times10^{-3}$, the conversion efficiency is 0.45. If cross talk factor is improved to $10^{-4}$, the conversion efficiency decreases to 0.39. However, for communication purposes, the cross-talk factor should be several orders of magnitude less than $10^{-4}$. Measurements have shown that the minimal de-tuning for orthogonal polarizations is $\approx \Delta\lambda/\partial\lambda_{FWHM} = 7.5$ to achieve acceptable performance, with minimal de-tuning for some polarizations being much higher. As a result, $\phi_{NL}^{max} \leq 0.16$ and peak conversion efficiency $P_{TH}^{peak}/P_{CW} = 0.025$ for conventional NOLMs.

As described above, optical pulse generators that provide top-hat shaped optical pulses are known in the art, but these generators generally exhibit limited linearity and conversion efficiency. Further, U.S. application Ser. No. 10/341,689 discloses a top-hat generator that may use commercially available parts, but the disclosed system and method, while providing improved linearity, still has limited conversion efficiency. Therefore, there exists a need in the art for an optical pulse generator that can generate optical pulses with a top-hat shape with improved conversion efficiency and linearity.

SUMMARY

An optical top-hat pulse generator, according to the present invention, comprises a non-linear optical loop mirror (NOLM) that is fed by a continuous wave (CW) optical signal and is controlled by incoming optical pulses comprising first order solitons. The soliton regime for the incoming optical pulses is obtained by choosing a fiber with the correct dispersion and by adjusting the peak power of the control pulses. The use of soliton control helps assure no spread of the control pulse, since the shape of the control pulse is maintained by fiber nonlinearity. The NOLM of the present invention comprises a fiber loop having one or more sections of polarization maintaining (PM) fiber coupled to each other at 90 degree angles. Preferably, the sections are spliced together. The use of the fiber loop having different sections of PM fiber spliced together allows the separation of the control pulse and the CW signal, while maintaining the desired difference in their group velocity.

A first embodiment of the present invention provides an optical top-hat pulse generator comprising: a polarization-maintaining coupler having a first side with a first arm and a second arm and a second side having a third arm and a fourth arm, the first arm adapted to receive a continuous wave optical signal and to launch the continuous wave optical signal into the arms on the second side; a polarization-maintaining fiber having a first end and a second end, the first end coupled to the third arm of the polarization-maintaining coupler and the second end coupled to the fourth arm; an optical filter coupled to the second arm of the first polarization-maintaining coupler; and a control pulse coupler positioned to launch optical energy into the polarization-maintaining fiber, the control pulse coupler having an input adapted to receive an optical control pulse.

Another embodiment of the present invention provides a method for optical top-hat pulse generation comprising the steps of: launching a linearly-polarized continuous wave optical signal along a first principal axis of a polarization-maintaining optical fiber loop; launching a linearly-polarized optical control pulse along a second principal axis of the polarization-maintaining optical fiber loop; controlling an intensity of the optical control pulse; and coupling an optical signal from the polarization-maintaining fiber loop to a polarizer to produce a top-hat optical pulse signal.

Still another embodiment of the present invention provides an apparatus for detecting a pulse position modulated optical signal comprising: a clock source providing a pulsed optical clock signal synchronized to said pulse position modulated optical signal; a continuous wave optical source producing a continuous wave optical signal; a first non-linear optical loop mirror receiving said continuous wave optical signal and said pulse position modulated signal and producing a first optical top-hat output signal, wherein said first non-linear optical loop mirror comprises a polarization-maintaining fiber loop; a second non-linear optical loop mirror receiving said continuous wave optical signal and said pulsed optical clock signal and producing a second optical top-hat output signal, wherein said second non-linear optical loop mirror comprises a polarization-maintaining fiber loop; and an overlap-to-electric converter receiving said first optical top-hat signal and said second optical top-hat signal and producing an electric signal proportional to an overlap amount between said first optical top-hat signal and said second optical top-hat signal.

Still another embodiment of the present invention provides a method for detecting a pulse position modulated signal comprising the steps of: receiving said pulse position modulated optical signal and polarizing said pulse position modulated optical signal to provide a linearly polarized pulse position modulated optical signal; providing a stream of optical clock pulses, wherein said optical clock pulses are linearly polarized; generating a first linearly polarized continuous wave optical signal having an optical wavelength different than an optical wavelength of the linearly polarized pulse position modulated signal and the polarization of the first linearly polarized continuous wave optical signal being orthogonal to the polarization of the linearly polarized pulse position modulated optical signal; launching the first linearly polarized continuous wave optical signal into a first non-linear optical loop mirror, the first non-linear optical loop mirror comprising a polarization-maintaining fiber loop having a first principal axis and a second principal axis and the linearly polarized continuous wave optical signal being launched into the polarization-maintaining fiber loop such that the polarization of the linearly polarized continuous wave optical signal is aligned with the first principal axis; coupling the linearly polarized pulse position modulated optical signal into the first non-linear optical loop mirror such that the polarization of the linearly polarized pulse position modulated optical signal is aligned with the second principal axis of the polarization-maintaining fiber loop of the first non-linear optical loop mirror; generating a second linearly polarized continuous wave optical signal having an optical wavelength different than an optical wavelength of the optical clock pulses and the polarization of the second linearly polarized continuous wave optical signal being orthogonal to the polarization of the optical clock pulses; launching the second linearly polarized continuous wave optical signal into a second non-linear optical loop mirror, the second non-linear optical loop mirror comprising a polarization-maintaining fiber loop having a first principal axis and a second principal axis and the second linearly polarized continuous wave optical signal being launched into the polarization-maintaining fiber loop such that the polarization of the second linearly polarized continuous wave optical signal is aligned with the first principal axis of the polarization-maintaining fiber loop of the second non-linear optical loop mirror; coupling the optical clock pulses into the second non-linear optical loop mirror such that the polarization of the optical clock pulses is aligned with the second principal axis of the polarization-maintaining fiber loop of the second non-linear optical loop mirror; coupling a first output optical signal out of the first non-linear optical loop mirror; filtering said first output signal with a filter that transmits around said optical wavelength of the first linearly polarized continuous wave optical signal and rejects around the optical wavelength of the linearly polarized pulse position modulated optical signal a first top-hat signal; coupling a second output optical signal out of the second non-linear optical loop mirror; filtering said second output signal with a filter that transmits around said optical wavelength of the second linearly polarized continuous wave optical signal and rejects around the optical wavelength of the optical clock pulses to produce a second top-hat signal; detecting the amount of overlap between the first top-hat signal and the second top-hat signal; and producing an electrical signal proportional to the amount of overlap.

DETAILED DESCRIPTION

The present invention now will be described more fully hereinafter with reference to the accompanying drawings, in which embodiments of the invention are shown. This invention may be embodied in many different forms and should not be construed as limited to the embodiments set forth herein.

Figure 6:
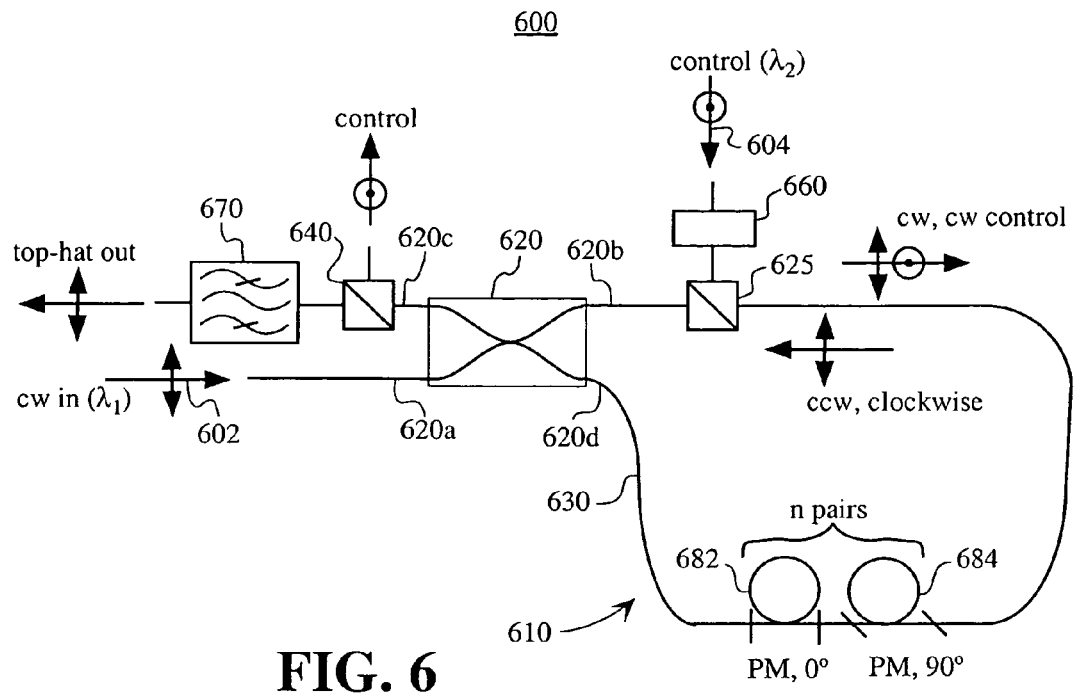
FIG. 6 shows a block diagram of an embodiment of a top-hat generator comprising at least one or more sections of PM fiber according to an embodiment of the present invention.

A top-hat generator 600 according to embodiments of the present invention is shown in FIG. 6. The top-hat pulse generator 600 enables the separation of the control pulse beam and the continuous wave (CW) beam spectrally, while maintaining the desired difference in their group delay velocity, by propagating the control pulse and CW beams along two principal axes of a polarization-maintaining (PM) fiber.

The top-hat pulse generator 600 of FIG. 6 comprises a polarization-maintaining (PM) NOLM 610, which is controllable by a first order soliton. In FIG. 6, an adjustable PM coupler 620, receives a continuous wave (CW) optical signal at optical wavelength $\lambda_1$ at a first arm 620a on a first side of the coupler 620 and launches the continuous wave optical signals into a PM fiber loop 630 from arms 620b, 620d on the second side of the coupler 620. The CW optical signal is launched into the PM fiber loop 630 such that the polarization of the CW optical signal is aligned along one of the principal axes of the PM fiber loop 630. That is, the CW optical signal will have a linear polarization that is aligned with one of the principal axes of the PM fiber loop 630. The "in plane" polarization of the continuous wave optical signal is chosen for illustration purposes only. The fiber loop 630 has positive (in ps/nm×km) dispersion. A second arm 620c on the first side of the coupler 620 produces the output signal from the NOLM 610.

Another coupler 625 is used to launch a control pulse, whose intensity is adjusted to match that of the fundamental soliton in the PM fiber, at an optical wavelength $\lambda_2$ into a second principal axis of the PM NOLM 610 in a clockwise direction. Hence, the control pulse will also be linearly polarized with a polarization that is orthogonal to that of the CW optical signal. A power control device 660, such as a fiber amplifier or attenuator, may be used to control the power of the control pulse. The fiber loop 630 comprises one or more sections of PM fiber 682, 684 spliced to each other at 90 degree angles, i.e., the fast axis of one piece is aligned to the slow axis of the other piece and vise versa. The length of each piece 682, 684 is chosen to provide the required magnitude of the group delay |Δt|, between the CW and control beams in the neighboring sections. In FIG. 6, a 0° section 682 is depicted spliced with a 90° section 684. One skilled in the art will appreciate that there may be many more pairs of fiber loops spliced together in accordance with the desired application. Finally, an optical filter 670 (which may be a bandpass, stop band, or edge filter) at the output of the NOLM 610 is used to reject signals at the optical wavelength $\lambda_2$ of the control pulse and to pass the resultant top-hat pulse at the optical wavelength $\lambda_1$ of the CW optical signal.

Figure 7:
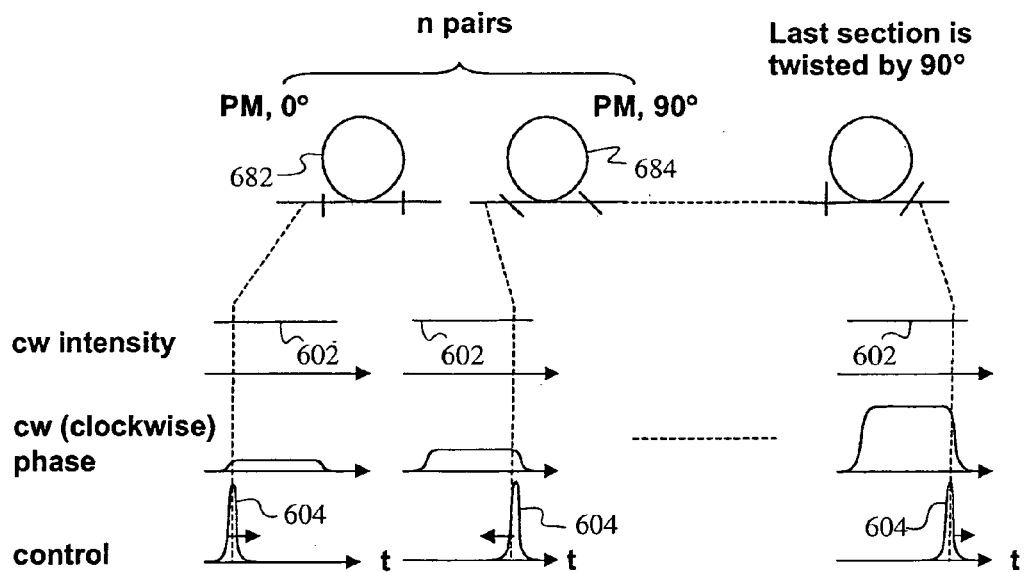
FIG. 7 depicts how the CW and control pulses switch relative speeds as they pass through the different sections of PM fiber of FIG. 6.

In the NOLM 610, the control pulse beam 604 imprints a nonlinear phase shift on the co-propagating CW beam 602 as the control beam 604 and the CW beam 602 slide in time against each other due to a slight mismatch in their group velocities. FIG. 7 depicts that the direction of the slide is switched in the consecutive sections 682, 684 of the PM fiber. The non-linear phase shift results in outcoupling of the CW beam 602. The peak intensity of the output at the CW wavelength beam is given by Eq. (4) or Eq. (14), which are the same. The control pulse is stripped off from the output, first, by a polarizer 640 and then by optical filter 670. In one embodiment, the optical filter 670 is preferably a "stop band" or "band pass" filter, e.g., reflecting chirped fiber gratings are especially attractive, since their stop band is well separated spectrally from $\lambda_1$ and, therefore, the filter 670 does not introduce chirp to the top-hat pulse. One skilled in the art will appreciate that the use of PM fiber in the NOLM 610 eliminates the need for polarization controllers, which improves the robustness and simplifies the system design.

The components of the NOLM 610 discussed above are generally well-known in the art. For example, 3 dB couplers are available from any number of commercial vendors, and no specific 3 dB coupler is preferred for embodiments of the present invention. Optical filters well known in the art may be used to provide the filter 670. Adjustable PM couplers 620 are also well known, such as those available from Canadian Instrumentation and Research Limited of Burlington, Ontario, Canada. The coupler 625 used to launch the control pulse into the loop is, preferably, a commercially available polarization coupler.

Typical parameters for a top-hat generator that is controllable by a first order soliton are described as follows. As described above, the peak power for achieving soliton regime is given by Eq. (3). The dispersion of a standard, that is, non dispersion-shifted, optical fiber is D≈17 ps/nm×km. A typical non-linear fiber constant is $\gamma=1.5$ $W^{-1}$ $km^{-1}$. With a control pulse having a duration $t_p=1$ ps and an optical wavelength of $\lambda=1.55$ μm, Eq. (3) dictates a peak power of $P_c \approx 40$ W for the first-order soliton. For a positive dispersion-shifted fiber with D≈3–6 ps/nm×km, the peak soliton power is $P_c \approx 10$ W. These peak powers correspond to average powers of $P_{avg} \approx 400$ mW and $P_{avg} \approx 100$ mW, respectively, for control pulses with a 10 Gpulse/s repetition rate. Control of the power of the control pulses may be provided by, for example, commercially available eridium-doped fiber amplifiers or attenuators.

The duration of the top-hat pulse is equal to the group delay Δt between the co-propagating CW and control beams. The delay acquired in a "slow" or "fast" section of the fiber (referring to the polarization of the control pulse) $L_{s,f}$ is given by $$\Delta t = L_{s,f} \left( \frac{1}{v_{f,s}(\lambda_p)} - \frac{1}{v_{s,f}(\lambda_{CW})} \right) \quad \text{Eq. (16)}$$

$$= L_{s,f} \left( \frac{1}{v_{f,s}(\lambda_p)} - \frac{1}{v_{s,f}(\lambda_p)} + \int_{\lambda_{cw}}^{\lambda_p} \frac{d}{d\lambda}\left(\frac{1}{v_{slow}(\lambda)}\right) d\lambda \right)$$

$$= L_{s,f} \left( \pm \Delta\left(\frac{1}{v}\right)_{f,s} + \int_{\lambda_{cw}}^{\lambda_p} D(\lambda) d\lambda \right)$$

Here, $v_{f,s}(\lambda)$ are, respectively, the group velocities for slow and fast axes of the fiber at the given wavelength.

The maximum phase shift for orthogonal polarizations of the control and CW radiations is $$\varphi_{NL}^{\max} = \sum_n \frac{4P_o \gamma t_o}{3|1/v_s - 1/v_c|} \qquad \text{Eq. (17)}$$

$$= \sum_n \frac{4L_{s,f} t_o}{3L_{NL} \Delta t}$$

$$= 0.76 \frac{t_{FWHM}}{\Delta t} \frac{L}{L_D(\lambda_p)}$$

where L is the total length of the fiber. L is preferably chosen such that the total length of the fiber is shorter than the dispersion length for the top-hat pulse to avoid its spreading time.

Therefore, $$\varphi_{NL}^{\max} \leq 0.76 \frac{t_{FWHM}}{\Delta t} \frac{L_D(\lambda_{CW})}{L_D(\lambda_P)} = 0.76 \frac{t_{FWHM}}{\Delta t} \frac{D(\lambda_p)}{D(\lambda_{CW})} \qquad \text{Eq. (18)}$$

One skilled in the art will appreciate that in a PM fiber, phase and group velocities differ for the two principal polarizations as opposed to non-PM fibers. Thus, the maximum phase shift is calculated slightly differently for PM fibers versus non-PM fibers.

For maximum conversion efficiency, the maximum phase shift is preferably 90°, that is $\phi_{NL,ns}^{\max}(t) = \pi/2$, which is achieved when:

$$\frac{D(\lambda_p)}{D(\lambda_{CW})} \geq 2.07 \frac{\Delta t}{t_{FWHM}}. \qquad \text{Eq. (19)}$$

One skilled in the art will appreciate that the ratio of $\Delta t / t_{FWHM}$ must be kept relatively high (preferably above 10), since only in this regime can the SNR advantages of the PPM communication link be realized. Therefore, performance may be optimized by setting the ratio of dispersion at the control and CW wavelengths above 10. The setting of the ratio above 10 is possible only if $\lambda_{CW}$ is close to the zero-dispersion wavelength of the fiber.

The choice of design parameters depends upon system requirements, e.g., $\Delta t/t_{FWHM}$ and $\lambda_p$, and the dispersion characteristics of available fibers. Most often it is desirable to choose $\lambda_p$ within the main 1.55 μm telecommunication window, i.e., 1530 nm $\leq \lambda_p \leq$ 1565 nm, since most efficient optical components, such as high power fiber amplifiers, are available for this spectral region. Dispersion D of a typical fiber versus the wavelength λ is given by $$D = S_o \left( \lambda - \frac{\lambda_o^4}{\lambda^3} \right) \qquad \text{Eq. (20)}$$

where $\lambda_o$ is the zero-dispersion wavelength and $S_o$ is the dispersion slop at $\lambda_o$.

Figure 8:
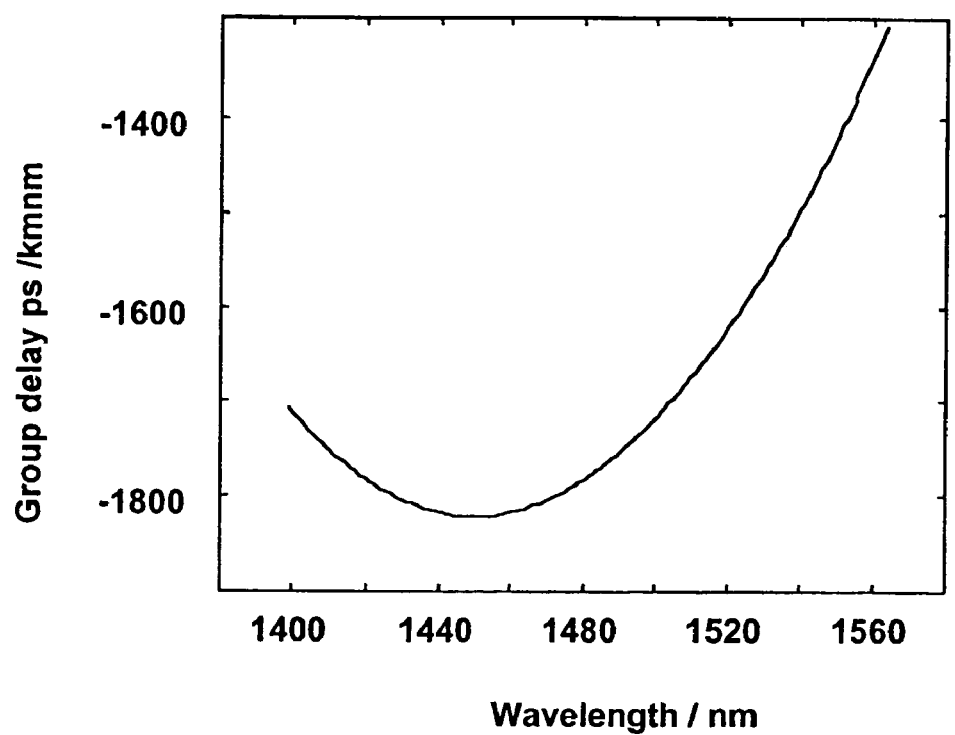
FIG. 8 is a graph of the group delay versus wavelength of an embodiment of the top-hat generator according to the present invention where the controlled pulse propagates along the slow axis.
Figure 9:
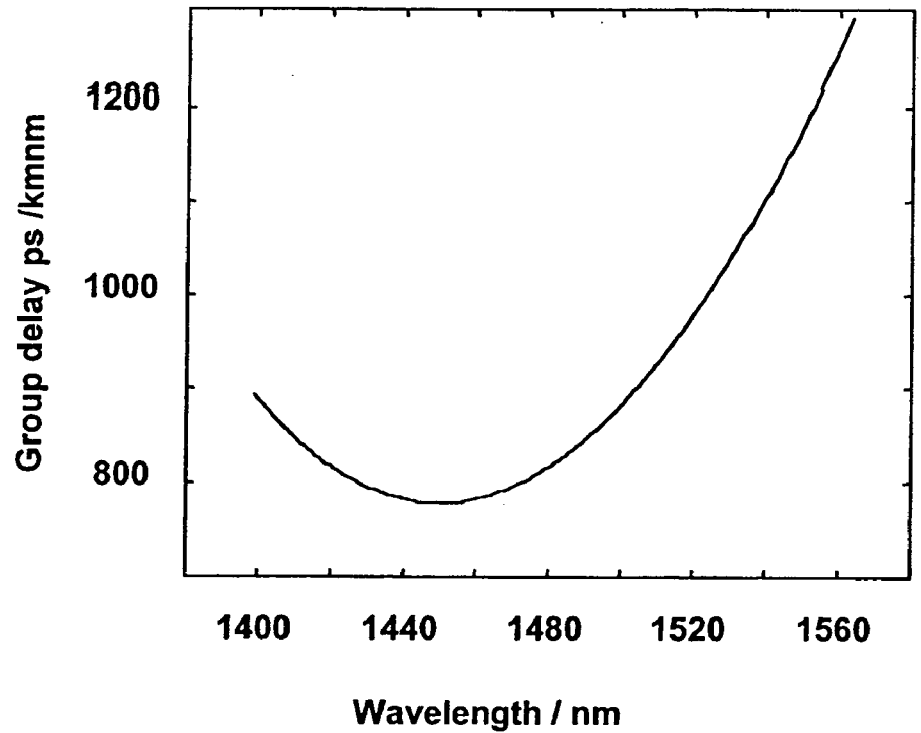
FIG. 9 is a graph of the group delay versus wavelength for a small-core fiber, such as those available from 3M of St. Paul, Minn., of an embodiment of the top-hat generator according to the present invention where the controlled pulse propagates along the fast axes.
Figure 10:
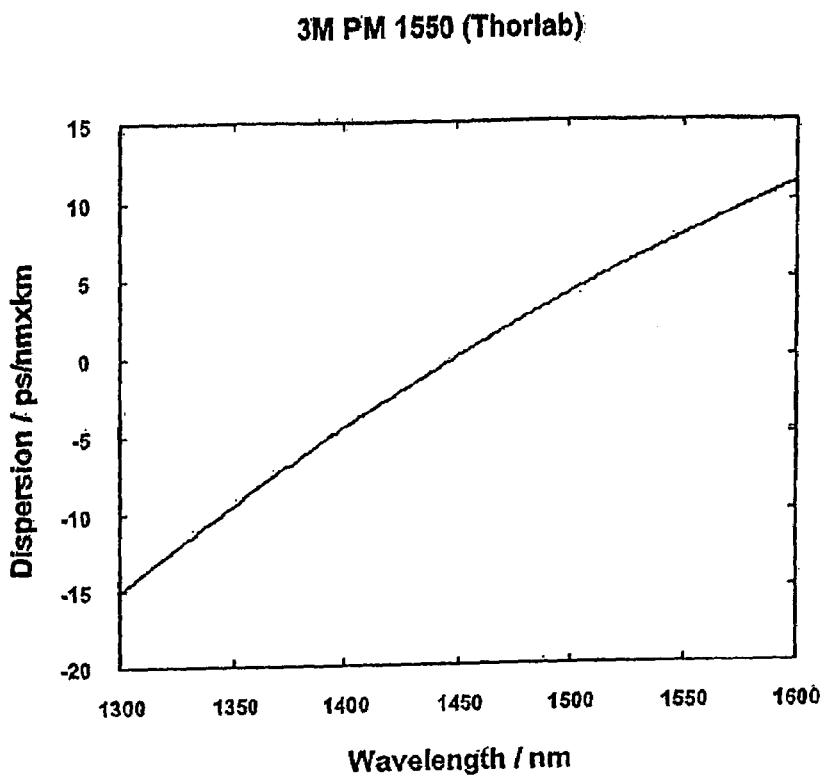
FIG. 10 shows a graph of the dispersion for a small core fiber from 3M and distributed by Thorlabs, Inc. of Newton, New Jersey.

One of the design parameters to consider is the length of the fiber. As mentioned above, the choice of design parameters depends upon the system requirements. For illustrative purposes, the following system requirements are assumed. First, the control wavelength is set at $\lambda_p = 1565$ nm. Second, a typical birefringence between the slow and fast fiber axes of $\Delta(1/v) = 1300$ ps/km is used. Third, the top-hat pulse duration $\Delta t = 50$ ps is desired. PM fibers from 3M of St. Paul, Minn., for example item #FS-PM-7811 sold by Thorlabs of Newton, New Jersey, have a 6 μm mode-field diameter and numerical aperture NA≈0.2, which corresponds to the cladding radius of about 2.3 μm. Fibers with such core sizes have zero dispersion wavelength at $\lambda_o = 1450$ nm, as shown by FIG. 10. Using Equation (16), the normalized group delay between the CW and control beams can be calculated, assuming $S_0 = 0.085$ ps/nm² km. FIGS. 8 and 9 present the results of the calculations of the group delay between the orthogonally-polarized control and CW beams for the slow and fast polarizations of the CW beams, respectively.

From the results shown in FIGS. 8 and 9, the group delay is minimized when $\lambda_{CW} = \lambda_o = 1450$ nm. Diode lasers and amplifiers operating at this wavelength (S-band), are commercially available (e.g. from Thorlab). From the group delay data in FIGS. 8 and 9 and the choice of $\lambda_{CW} = \lambda_o = 1450$ nm, the length of fiber for the slow and fast axes can be calculated. Thus, $L_{s,f} = 61$ and 27.5 m, respectively. Assuming L≈1 km, the result is that 11 pairs of fiber should be used in the loop. One skilled in the art will appreciate that as the number of pairs of fiber increases, the loss in the system also increases. Generally, as each fiber is spliced together, the splice loss is ~0.05 dB/splice. This loss is combined with the intrinsic fiber loss, which is generally ≈2 dB/km. It is important to note that the loss is preferably less than 3 dB, as 3 dB is close to the dynamic range of the soliton stability.

The maximum non-linear shift given by Eq. (18) is calculated via:

$$\varphi_{NL}^{\max} = 0.76 \frac{t_{FWHM}}{\Delta t} \frac{L}{L_D(\lambda_P)} = 0.376 \frac{\lambda^2 DL}{ct_{FWHM} \Delta t} = 0.64 \qquad \text{Eq. (21)}$$

for $t_{FWHM} = 1$ ps and D=10 ps/nm×km. The conversion efficiency is found from Eq. (15) as follows:

$$P_{TH}^{peak}/P_{cw} = \sin^2(\phi_{NL}^{\max}) = 0.36 \qquad \text{Eq. (22)}$$

which is considerably higher than that obtained from the design described in U.S. patent application Ser. No. 10/341,689, as discussed above.

One skilled in the art will appreciate that large-core fibers, such as Panda from Fujikura, Japan, that have zero dispersion wavelength near 1300 nm, are not preferred for use with the system depicted in FIG. 6 when $\lambda_p$ is chosen in the main communication window, for the reasons set forth below. Thus fibers with smaller cores, that have $\lambda_o$ shifted towards longer wavelengths, are preferable.

Figure 11:
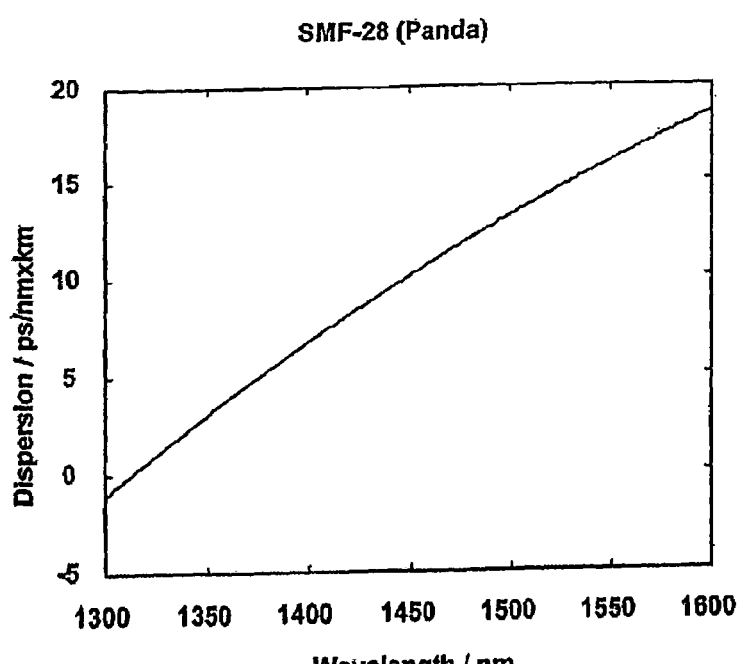
FIG. 11 shows a graph of the dispersion for a larger core fiber from Fujikura of Japan.

Large core PM-SMF fiber, such as Panda from Fujikura have a zero dispersion wavelength $\lambda_o \approx 1320$ nm, as shown in FIG. 11, and $S_o = 0.085$ ps/nm² km. Using Equation (20), one skilled in the art will understand that the control pulse with 1530 nm $\leq \lambda_p \leq$ 1565 nm is always faster than a CW beam with $\lambda_{CW} = \lambda_o = 1320$ nm. The control pulse is always faster than the CW beam even if the control pulse is aligned along the slow axis and the CW beam is aligned along the fast axis, because the birefringence of the fiber is not sufficient to overcome dispersion of these far separated spectral components. As a result, when $\lambda_p$ is chosen in the main communication window and a large core PM-SMF fiber is used, a multi-section piece of fiber, where the two beams travel back and forth against each other will not increase the conversion efficiency. Thus, when using large core PM-SMF fibers, it is preferable to use either a single section, or a shorter wavelength of the control pulse.

Figure 1:
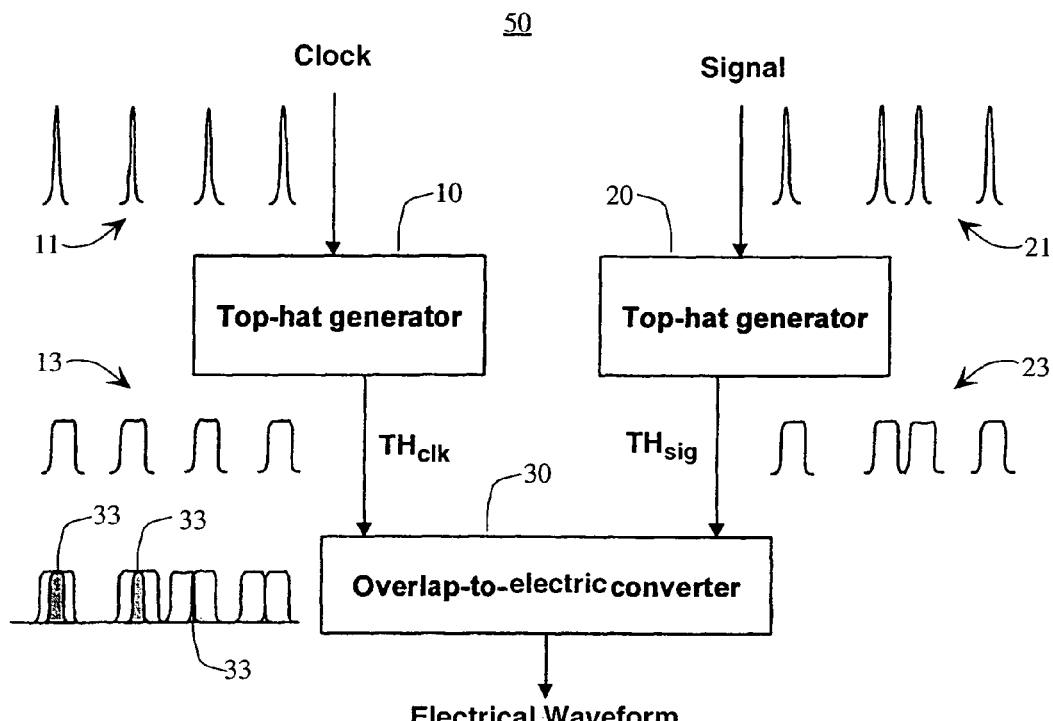
FIG. 1 (prior art) shows a block diagram of an optical pulse position modulation receiver in accordance with the present invention.
Figure 2:
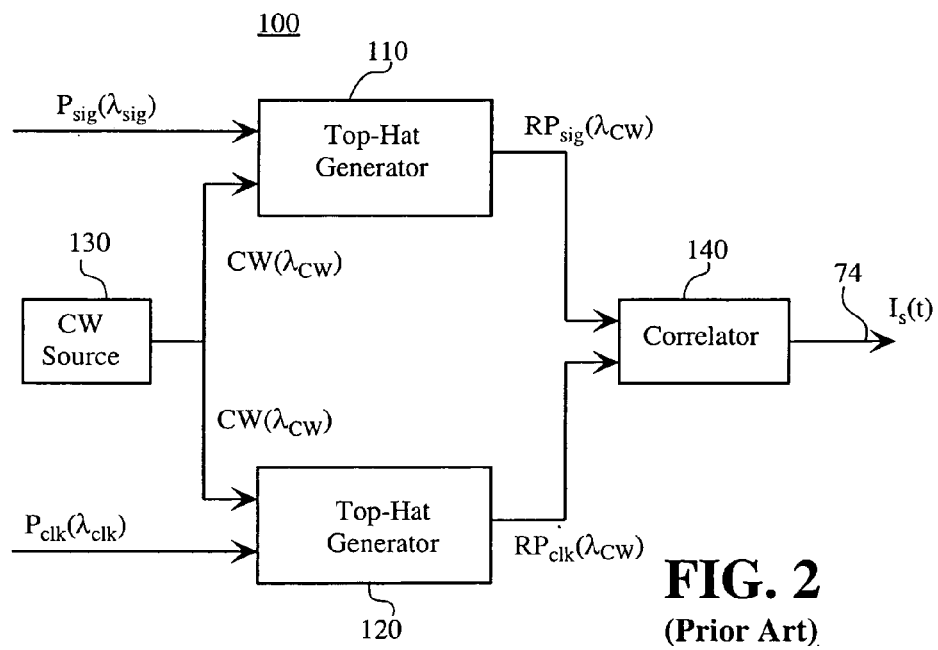
FIG. 2 (prior art) shows a block diagram of an optical pulse position modulation receiver using correlation of top-hat pulses to provide an electrical output.
Figure 3:
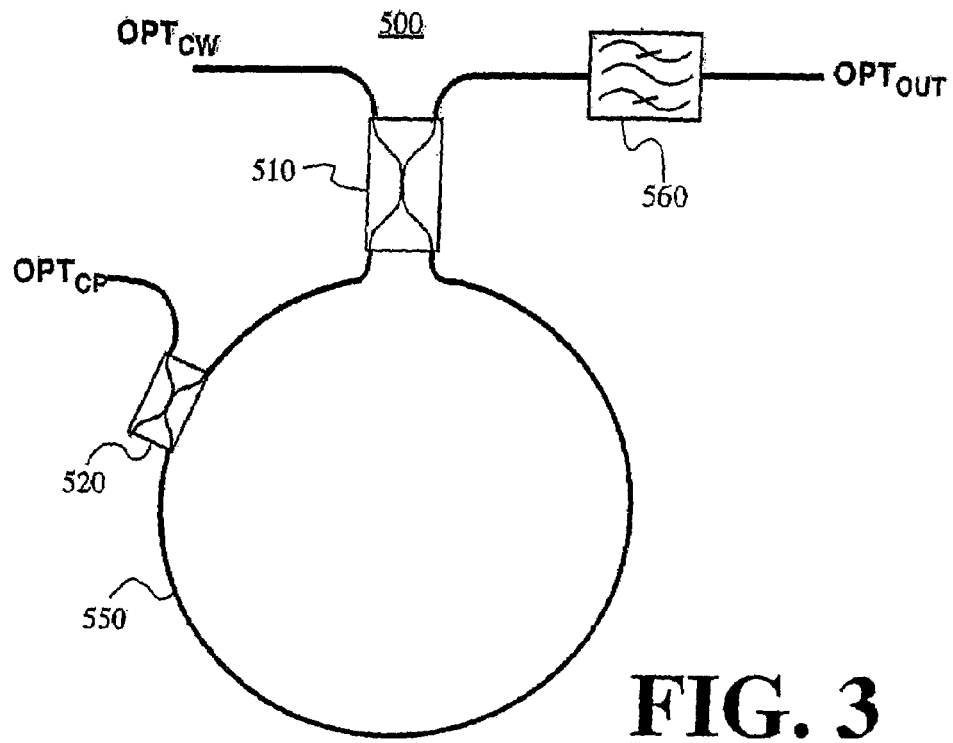
FIG. 3 (prior art) shows a schematic representation of a typical non-linear optical loop mirror with an optical control.
Figure 5:
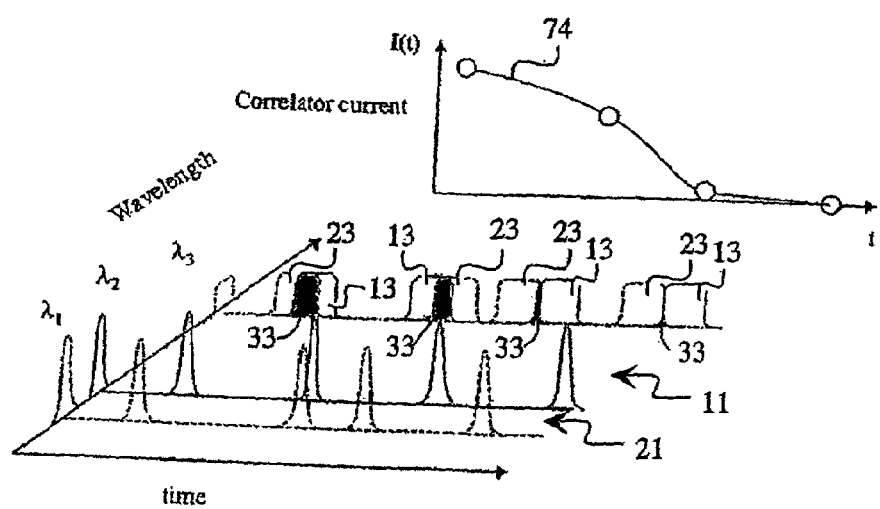
FIG. 5 depicts how the pulse and control signals interact and vary as they travel through the fiber.
Figure 4A:
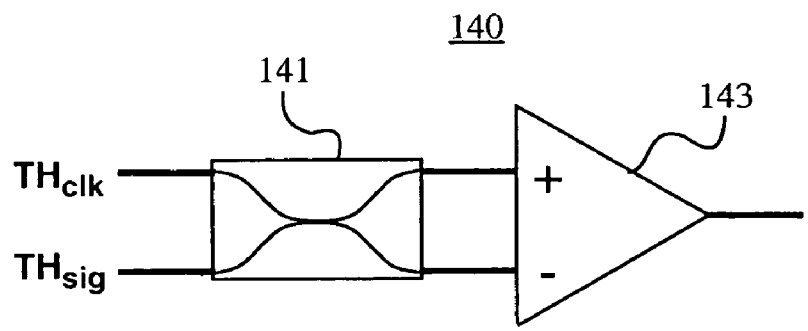
FIG. 4A (prior art) shows a schematic diagram of an optical correlator for use in the receiver depicted in FIG. 2.
Figure 4B:
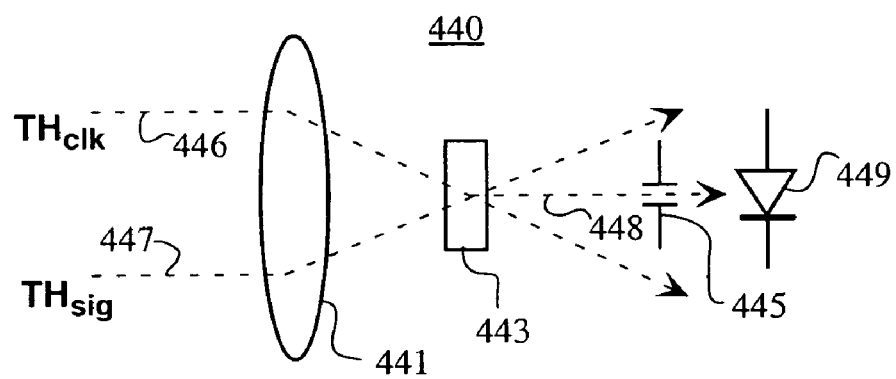
FIG. 4B (prior art) depicts a sum frequency generation apparatus for performing overlap to electric conversion.
Figure 4C:
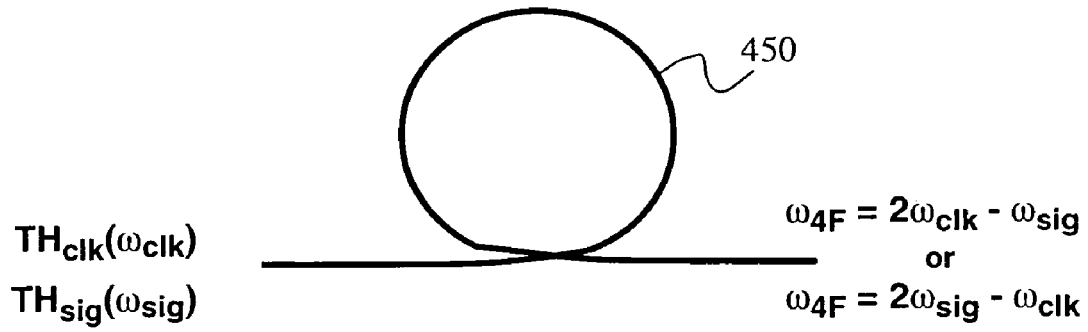
FIG. 4C (prior art) depicts a four-wave mixing apparatus for performing overlap to electric conversion.

One skilled in the art will understand that embodiments of the NOLM according to the present invention may provide for improved performance of systems for detecting and demodulating pulse position modulated signals. For example, a NOLM using polarization-maintaining fiber as described herein may be used in the optical receivers depicted in FIGS. 1 and 2 and described above. Those skilled in the art will understand that the improved linearity and conversion efficiency provided by embodiments of NOLMs according to the present invention will result in improved performance in such receivers.

From the foregoing description, it will be apparent that the present invention has a number of advantages, some of which have been described herein, and others of which are inherent in the embodiments of the invention described herein. Also, it will be understood that modifications can be made to the method described herein without departing from the teachings of subject matter described herein. As such, the invention is not to be limited to the described embodiments except as required by the appended claims.

What is claimed is:

1. An optical top-hat pulse generator comprising:
a polarization-maintaining coupler having a first side with a first arm and a second arm and a second side having a third arm and a fourth arm, the first arm adapted to receive a continuous wave optical signal and to launch the continuous wave optical signal into the arms on the second side;
a polarization-maintaining fiber having a first end and a second end, the first end coupled to the third arm of the polarization-maintaining coupler and the second end coupled to the fourth arm;
an optical filter coupled to the second arm of the first polarization-maintaining coupler; and
a control pulse coupler positioned to launch optical energy into the polarization-maintaining fiber, the control pulse coupler having an input adapted to receive an optical control pulse.

2. The optical top-hat pulse generator of claim 1 wherein the polarization-maintaining optical fiber has a first principal axis and a second principal axis and wherein the continuous wave optical signal is linearly polarized and is launched into the polarization-maintaining fiber such that the polarization of the continuous wave optical signal is aligned with the first principal axis and wherein the optical control pulse is linearly polarized and is launched into the polarization fiber such that the polarization of the optical control pulse is aligned with the second principal axis.

3. The optical top-hat pulse generator of claim 2 wherein said polarization-maintaining optical fiber loop comprises two or more sections of polarization-maintaining fiber coupled together, wherein the first principal axis of one section is aligned to the second principal axis of an adjacent section.

4. The optical top-hat pulse generator of claim 1 further comprising a power control device coupled to said control pulse coupler, said power control device controlling the power of optical control pulse.

5. The optical top-hat pulse generator of claim 4 wherein said power control device is a fiber amplifier or an attenuator.

6. The optical top-hat pulse generator of claim 1 further comprising a polarizer disposed at the second arm or at an output of the optical filter.

7. The optical top-hat pulse generator of claim 1 wherein the optical filter is a bandpass filter, a stop band filter or an edge filter.

8. The optical top-hat pulse generator of claim 1 wherein the first polarization-maintaining coupler is an adjustable coupler and a coupling ratio of the polarization-maintaining coupler is adjusted to minimize an output signal at the second arm when no optical control pulse is launched into the optical coupler.

9. The optical top-hat pulse generator of claim 1 wherein the intensity of the optical control pulse is controlled to that of a fundamental soliton of the polarization-maintaining fiber.

10. The optical top hat generator of claim 3, wherein the two or more sections of polarization-maintaining fiber are spliced together.

11. The optical top-hat pulse generator of claim 1 wherein the polarization-maintaining fiber has a zero dispersion wavelength and the continuous wave optical signal is launched into the polarization-maintaining fiber at the zero dispersion wavelength.

12. A method for optical top-hat pulse generation comprising:
launching a linearly-polarized continuous wave optical signal along a first principal axis of a polarization-maintaining optical fiber loop;
launching a linearly-polarized optical control pulse along a second principal axis of the polarization-maintaining optical fiber loop;
controlling an intensity of the optical control pulse; and
coupling an optical signal from the polarization-maintaining fiber loop to a polarizer to produce a top-hat optical pulse signal.

13. The method of claim 12 further comprising filtering the top-hat optical pulse signal.

14. The method of claim 12 wherein said polarization-maintaining optical fiber loop comprises two or more sections of polarization-maintaining optical fiber coupled together, wherein a first principal axis of one section is aligned to a second principal axis of an adjacent section.

15. The method of claim 12 further comprising the step of controlling a power associated with said control pulse.

16. The method of claim 15 wherein the power of the control pulse is controlled to that of a fundamental soliton of the polarization-maintaining optical fiber loop.

17. The method of claim 12 wherein the linearly-polarized continuous wave optical signal is launched into the polarization-maintaining optical fiber loop using an adjustable polarization-maintaining coupler and a coupling ratio of the polarization-maintaining coupler is adjusted to minimize an output from the polarization-maintaining coupler in the absence of the linearly-polarized optical control pulse.

18. The method of claim 12 wherein the polarization-maintaining optical fiber loop has a zero dispersion wavelength and the continuous wave optical signal is launched into the polarization-maintaining optical fiber loop at the zero dispersion wavelength.

19. The method of claim 14 wherein the two or more sections of polarization-maintaining optical fiber are spliced together.

20. An apparatus for detecting a pulse position modulated optical signal comprising:

a clock source providing a pulsed optical clock signal synchronized to said pulse position modulated optical signal;

a continuous wave optical source producing a continuous wave optical signal;

a first non-linear optical loop mirror receiving said continuous wave optical signal and said pulse position modulated signal and producing a first optical top-hat output signal, wherein said first non-linear optical loop mirror comprises a polarization-maintaining fiber loop;

a second non-linear optical loop mirror receiving said continuous wave optical signal and said pulsed optical clock signal and producing a second optical top-hat output signal, wherein said second non-linear optical loop mirror comprises a polarization-maintaining fiber loop; and an overlap-to-electric converter receiving said first optical top-hat signal and said second optical top-hat signal and producing an electric signal proportional to an overlap amount between said first optical top-hat signal and said second optical top-hat signal.

21. The apparatus according to claim 20, wherein said overlap-to-electric converter comprises a coherent correlator, a sum frequency generator, or a four-wave mixer.

22. The apparatus of claim 20 wherein the polarization-maintaining fiber loop of the first non-linear optical loop mirror and/or the second non-linear optical loop mirror has a first principal axis and a second principal axis, and the continuous wave signal is polarized and launched into the polarization-maintaining fiber loop so that the polarization of the continuous wave signal is aligned with the first principal axis.

23. The apparatus of claim 22 wherein said polarization-maintaining fiber loop comprises two or more sections of polarization-maintaining fiber coupled together, wherein said first principal axis of one section is aligned to the second principal axis of an adjacent section.

24. A method for detecting a pulse position modulated optical signal comprising:

receiving said pulse position modulated optical signal and polarizing said pulse position modulated optical signal to provide a linearly polarized pulse position modulated optical signal;

providing a stream of optical clock pulses, wherein said optical clock pulses are linearly polarized;

generating a first linearly polarized continuous wave optical signal having an optical wavelength different than an optical wavelength of the linearly polarized pulse position modulated signal and the polarization of the first linearly polarized continuous wave optical signal being orthogonal to the polarization of the linearly polarized pulse position modulated optical signal;

launching the first linearly polarized continuous wave optical signal into a first non-linear optical loop mirror, the first non-linear optical loop mirror comprising a polarization-maintaining fiber loop having a first principal axis and a second principal axis and the linearly polarized continuous wave optical signal being launched into the polarization-maintaining fiber loop such that the polarization of the linearly polarized continuous wave optical signal is aligned with the first principal axis;

coupling the linearly polarized pulse position modulated optical signal into the first non-linear optical loop mirror such that the polarization of the linearly polarized pulse position modulated optical signal is aligned with the second principal axis of the polarization-maintaining fiber loop of the first non-linear optical loop mirror;

generating a second linearly polarized continuous wave optical signal having an optical wavelength different than an optical wavelength of the optical clock pulses and the polarization of the second linearly polarized continuous wave optical signal being orthogonal to the polarization of the optical clock pulses;

launching the second linearly polarized continuous wave optical signal into a second non-linear optical loop mirror, the second non-linear optical loop mirror comprising a polarization-maintaining fiber loop having a first principal axis and a second principal axis and the second linearly polarized continuous wave optical signal being launched into the polarization-maintaining fiber loop such that the polarization of the second linearly polarized continuous wave optical signal is aligned with the first principal axis of the polarization-maintaining fiber loop of the second non-linear optical loop mirror;

coupling the optical clock pulses into the second non-linear optical loop mirror such that the polarization of the optical clock pulses is aligned with the second principal axis of the polarization-maintaining fiber loop of the second non-linear optical loop mirror;

coupling a first output optical signal out of the first non-linear optical loop mirror;

filtering said first output signal with a filter that transmits around said optical wavelength of the first linearly polarized continuous wave optical signal and rejects around the optical wavelength of the linearly polarized pulse position modulated optical signal a first top-hat signal;

coupling a second output optical signal out of the second non-linear optical loop mirror;

filtering said second output signal with a filter that transmits around said optical wavelength of the second linearly polarized continuous wave optical signal and rejects around the optical wavelength of the optical clock pulses to produce a second top-hat signal;

detecting the amount of overlap between the first top-hat signal and the second top-hat signal; and producing an electrical signal proportional to the amount of overlap.

25. The method of claim 24 wherein the polarization-maintaining fiber loop of the first non-linear optical loop mirror and/or the second non-linear optical loop mirror comprises two or more sections of polarization-maintaining fiber spliced together, and wherein said first principal axis of one section is aligned to the second principal axis of an adjacent section.

26. The method of claim 24 wherein the first linearly polarized continuous wave signal and the second linearly polarized continuous wave signal are generated from one master continuous wave signal.

* * * * *